(12) United States Patent
Born et al.

(10) Patent No.: US 9,869,972 B2
(45) Date of Patent: Jan. 16, 2018

(54) PEDOMETER INCORPORATED IN A MECHANICAL WATCH

(71) Applicant: The Swatch Group Research and Development Ltd, Marin (CH)

(72) Inventors: Jean-Jacques Born, Morges (CH); Yvan Ferri, Lausanne (CH); Dominique Lechot, Les Reussilles (CH); Cedric Nicolas, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 15/291,114

(22) Filed: Oct. 12, 2016

(65) Prior Publication Data

US 2017/0115635 A1 Apr. 27, 2017

(30) Foreign Application Priority Data

Oct. 26, 2015 (EP) .................................... 15191437

(51) Int. Cl.
   *G04B 37/14* (2006.01)
   *G04B 47/06* (2006.01)
   *G01C 22/00* (2006.01)

(52) U.S. Cl.
   CPC ......... *G04B 47/063* (2013.01); *G01C 22/006* (2013.01); *G04B 37/1486* (2013.01)

(58) Field of Classification Search
   CPC .... G04B 37/1486; G04B 47/00; G04B 47/06; G04B 47/063; G01C 22/006
   See application file for complete search history.

(56) References Cited

U.S. PATENT DOCUMENTS

| 694,652 | A | * | 3/1902 | Kuhn | G01C 22/006 |
| | | | | | 235/105 |
| 3,818,194 | A | | 6/1974 | Biro | |
| 4,056,265 | A | * | 11/1977 | Ide | A63B 69/0035 |
| | | | | | 235/99 R |
| 4,322,609 | A | | 3/1982 | Kato | |

(Continued)

FOREIGN PATENT DOCUMENTS

EP 0 060 361 A1 9/1982

OTHER PUBLICATIONS

European Search Report dated Apr. 7, 2016 in European Application 15191437, filed on Oct. 26, 2015 ( with English Translation of Categories of Cited Documents).

*Primary Examiner* — Vit W Miska
(74) *Attorney, Agent, or Firm* — Oblon, McClelland, Maier & Neustadt, L.L.P.

(57) ABSTRACT

A watch includes a pedometer mechanism for estimating a physical activity level. The watch includes at least one moving or pivoting weight arranged to drive a ratchet, an elastic or friction holder for holding the ratchet in position between two movements of the moving or pivoting weight, the ratchet driving a gear train displaying, on a display, a value corresponding, to within a multiplicative factor, to the number of pivoting motions of the ratchet, and/or to the value of the cumulative angular rotation of the ratchet, and the pedometer mechanism includes a limiter only allowing the pivoting of the ratchet from a minimum threshold corresponding to a minimum travel of the weight if the weight is movable or to a minimum angular rotation value of the weight if the weight pivots.

20 Claims, 7 Drawing Sheets

(56) References Cited

U.S. PATENT DOCUMENTS

| | | |
|---|---|---|
| 4,387,437 A | 6/1983 | Lowrey et al. |
| 4,460,823 A | 7/1984 | Ruehlemann |
| 4,792,665 A * | 12/1988 | Ruhlemann .......... G01C 22/006 235/105 |

* cited by examiner

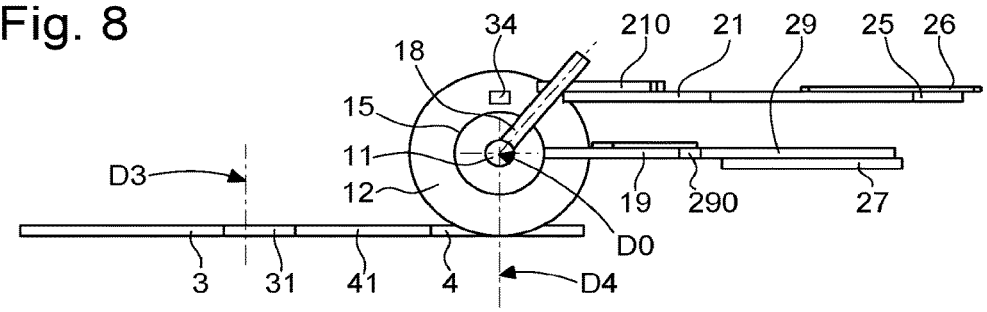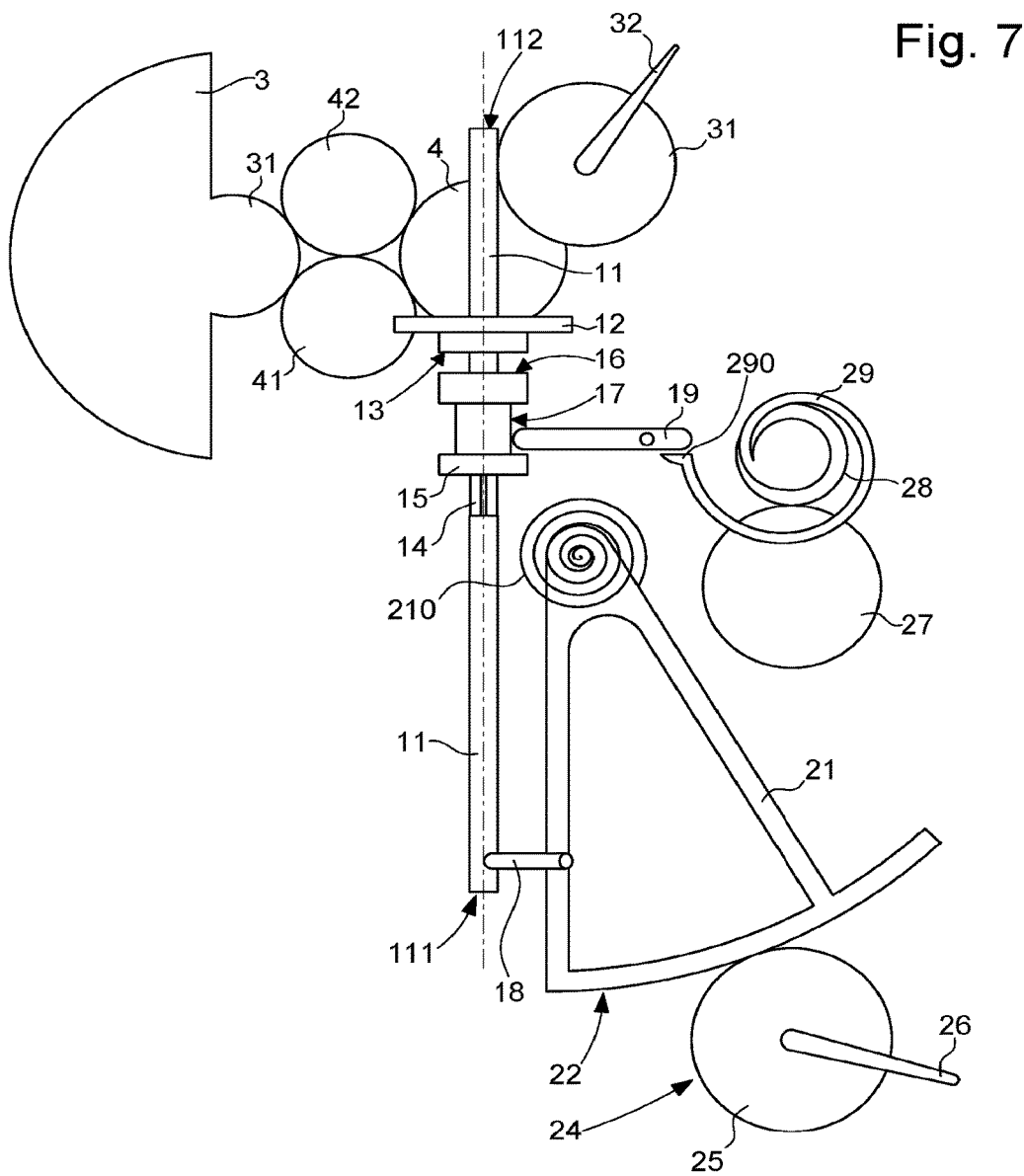

PEDOMETER INCORPORATED IN A MECHANICAL WATCH

This application claims priority from European Patent application 15191437.1 of Oct. 26, 2015, the entire disclosure of which is hereby incorporated herein by reference.

FIELD OF THE INVENTION

The invention concerns a watch comprising a pedometer mechanism for estimating a physical activity level, comprising at least one moving or pivoting weight arranged to drive a ratchet, and elastic or friction holding means for holding said ratchet in position between two movements of said moving or pivoting weight.

The invention concerns the field of mechanical watches, particularly pedometer-type watches.

BACKGROUND OF THE INVENTION

Since the invention of pedometer watches in the XIX century, the quantification of human physical activity has changed a great deal, especially since the appearance of watches having an electronic movement. The design of mechanical watches for such uses has been neglected, although many users are mechanical watch aficionados and do not wish to wear two different devices, one for measuring and displaying time and the other for measuring physical activity.

U.S. Pat. No. 4,460,823 A in the name of RUEHLEMANN GERHARD describes a pedometer for indicating distance travelled by a walker or a runner, comprising a mechanical digital counter, driven via a gear train from a ratchet wheel. A pivoting pendulum is maintained in an at-rest position by a first biasing spring, which is suitable for use during walking. During running-type operation with more kinetic energy on the pendulum, a second return spring may be selectively engaged with the first biasing spring to increase the tension thereof, to absorb the additional energy without damage to the device. A movable stop for the pendulum comprises an external adjustment knob to set the pendulum travel according to the length of stride of the user. The user may change the length of stride and the walk/run mode without resetting the digital distance indicator.

U.S. Pat. No. 3,818,194 A in the name of BIRO describes a pedometer intended to indicate the distance travelled by the user, comprising inside a case a support plate for a distance indicator means, and drive means for the indicator means, said drive means comprise a gear train operatively connected to the indicator means, a pendulum, means for pivotally mounting one end of the pendulum to the plate, the pendulum being swingable in a plane substantially perpendicular to the support plate, in response to the strides of the user, means for converting the swinging motion of the pendulum into an incremental rotational motion of the gear train.

SUMMARY OF THE INVENTION

The invention proposes to incorporate a step counter or an activity measurement in a mechanical watch, where possible using components already existing in the watch.

To this end, the invention concerns a watch according to claim 1.

BRIEF DESCRIPTION OF THE DRAWINGS

Other features and advantages of the invention will appear upon reading the following detailed description, with reference to the annexed drawings, in which:

FIG. 7 is a plan view of the mechanism of FIG. 6.

FIG. 8 is an end view of the mechanism of FIG. 6, in a plane perpendicular to the axis of the fluted shaft and to the plane of the toothed sector.

DETAILED DESCRIPTION OF PREFERRED EMBODIMENTS

Figure 1:
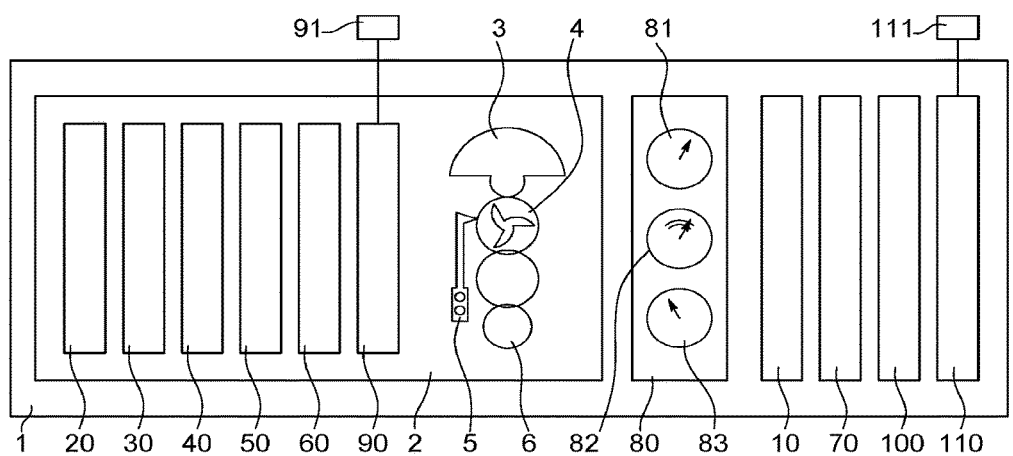
FIG. 1 is a block diagram representing a watch comprising a movement, a date mechanism, display means, a chronograph mechanism, display reset means, and a pedometer mechanism according to the invention.

The invention concerns a watch 1, particularly a mechanical watch, arranged to be attached to a limb of a user, comprising a movement 100 and display means 80.

Watch 1 comprises a pedometer mechanism 2, which is arranged to estimate a physical activity level related to the movement of a limb and/or of the watch user. The term "pedometer" is used by default, since it corresponds to a type of device known to the general public, particularly in electronic form, and whose applications have long since no longer been limited to the mere counting of steps performed by the first timepiece pedometers.

Pedometer mechanism 2 according to the invention comprises two parts: a counter mechanism and a display mechanism. As will be explained below, in the variants, this display mechanism may or may not include a reset mechanism.

This pedometer mechanism 2 includes at least one moving or pivoting weight 3.

In a particular embodiment illustrated by FIGS. 1 to 10, this weight 3 is arranged to pivot about a weight axis D3 under the action of the motions of the user. Moving or pivoting weight 3 is arranged to drive, directly or indirectly, in only one direction of pivoting, at least one ratchet 4 about a ratchet axis D4.

Moving or pivoting weight 3 is preferably but in a non-limiting manner, similar to an oscillating weight of an automatic winding mechanism. In a particular embodiment, moving or pivoting weight 3 also forms an oscillating weight of an automatic winding mechanism for recharging an accumulator of the barrel type or similar.

However, the invention may also be implemented with a weight 3 that moves other than in a pivoting motion, with a linear travel or along a particular trajectory, for example, a circular trajectory inside a groove or suchlike. The notion of movement thus replaces the restrictive notion of pivoting, and the notion of travel, in the broad sense, replaces the notion of angular travel.

Pedometer mechanism 2 comprises means 5 for holding ratchet 4, especially by friction and/or by elastic return. Holding means 5 are arranged to hold ratchet 4 in position between two movements or pivoting motions, depending on the case, of moving or pivoting weight 3.

According to the invention, ratchet 4 preferably drives a gear train 6, which is arranged to display, on at least a first display 81 comprised in display means 80 of watch 1, a value that corresponds, to within a multiplicative factor, to the number of pivoting motions of ratchet 4 and/or to the value of the cumulative angle through which ratchet 4 has pivoted.

This displayed value is thus characteristic of the activity exerted by the user.

Advantageously, moving or pivoting weight 3 is arranged to also replenish with energy at least one barrel or energy accumulator.

According to the invention, pedometer mechanism 2 comprises a limiting means 20, which is arranged to allow the pivoting of ratchet 4 only from a minimum threshold corresponding to a minimum travel, or to a given minimum angular value $\theta_0$, of movement or respectively of pivoting motion of moving or pivoting weight 3.

In a particular variant, pedometer mechanism 2 comprises a detection means 30, which is arranged to detect the direction of movement, particularly of pivoting motion, of moving or pivoting weight 3. Pedometer mechanism 2 further comprises a locking means 40, which is arranged to only allow the pivoting of ratchet 4 if detection means 30 has recorded, since the preceding pivoting motion of ratchet 4, at least one movement, particularly a pivoting motion, of moving or pivoting weight 3, in the opposite direction to that permitted by the driving of ratchet 4.

More particularly, detection means 30 includes a first lever which is arranged to be driven by moving or pivoting weight 3, and which changes angular position according to the direction of movement, particularly of pivoting motion, in which it is driven.

More particularly still, locking means 40 comprises a second bidirectional lever, which is arranged to be immobilised or released by the first lever, according to the angular position of the first lever. This second bidirectional lever, according to the position that it occupies, prevents or allows the pivoting of ratchet 4.

In a particular embodiment, locking means 40 is a differential totalizer mechanism.

In a particular variant, watch 1 comprises a means 50 for measuring the travel of movement, particularly the pivoting motion, of moving or pivoting weight 3 during each of its movements, particularly pivoting motions. The watch preferably also includes a means 60 of cumulating the absolute values of the successive travels measured by the measuring means starting from an initial moment.

More particularly, watch 1 comprises a control means 70 for determining an initial moment and a final moment.

More particularly, display means 80 comprise first display 81, and a means 83 for the cumulative display of a magnitude homothetic to the cumulative value of the absolute successive travel values, and watch 1 comprises a reset means 110 for removing the value displayed by at least one of display means 80.

In a particular embodiment, by default, each day, the initial moment is at zero hour, and the final moment is at midnight.

In a particular embodiment, control means 70 is a chronograph mechanism.

Preferably, watch 1 comprises a date mechanism 10, which is arranged to control, daily at midnight, a reset mechanism 110 to remove the values displayed on at least a first display 81. This control can be achieved with a twenty-four hour wheel and an ad hoc mechanism to actuate a jump at midnight, well known to those skilled in the art.

In a particular variant, in order to adjust the use of watch 1 and the display that it provides to various types of activities corresponding to quite different categories of energy expenditure, watch 1 comprises a reduction means 90, which is adjustable by the user via a first actuator 91, to change the display transmission ratio, according to the type of activity exerted by the user.

In another particular variant, as seen in particular embodiments in FIG. 12, watch 1 comprises a plurality of X+1 first displays 81, each corresponding to one day of a particular observation period, notably here where X=6 corresponds to a day of the week. Watch 1 also comprises a date mechanism 10, which is arranged to actuate, daily before midnight, the reset of a first display 81 for the next day, and at midnight the change of display from first display 81 for the preceding day to first display 81 for the day that is beginning. Thus the user may, during his observation period, particularly a week, keep the simultaneous display of energy expenditure for each of the successive days forming this period, the display relating to the oldest day being deleted, each day at midnight, in favour of the display relating to the day that is beginning.

In the particular example of FIGS. 12A to 12F, the dial comprises, in seven positions I, II, III, IV, V, VI, VII, seven small hands for indicating the activity of the last seven days. At midnight, a vertical coupling changes from one hand to the next after first effecting a reset. Each hand wheel is held in position by slight friction.

Figure 12A:
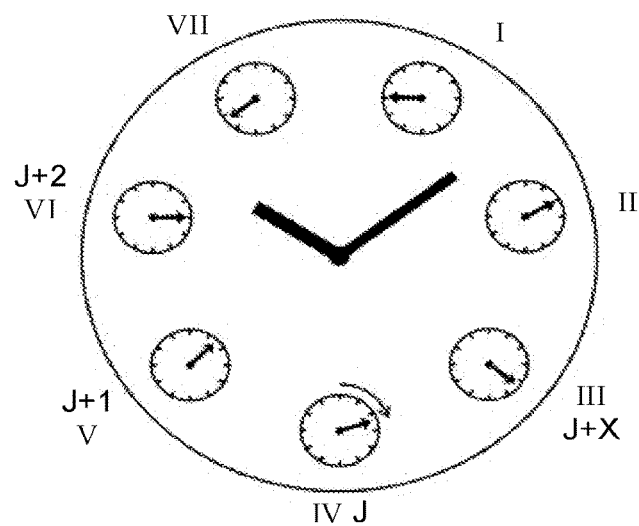
FIGS. 12A to 12F are several representations of different variants for the display of physical activity over a whole week.
Figure 12B:
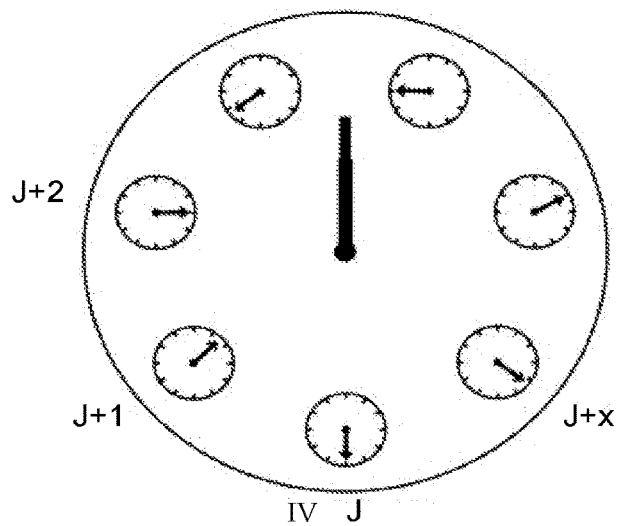

The diagram of FIG. 12A concerns, on small dial IV, day J at 10:10, the hand provides an incremental daily activity display. The other days are fixed: dial V: J+1, dial VI: J+2, . . . , dial III: J+X. The diagram of FIG. 12B concerns the same mechanism, on small dial IV, on day J at 24:00 the daily activity is locked. After midnight, the mechanism locks the hand for the previous day, and disengages the drive mechanism thereof.

Figure 12C:
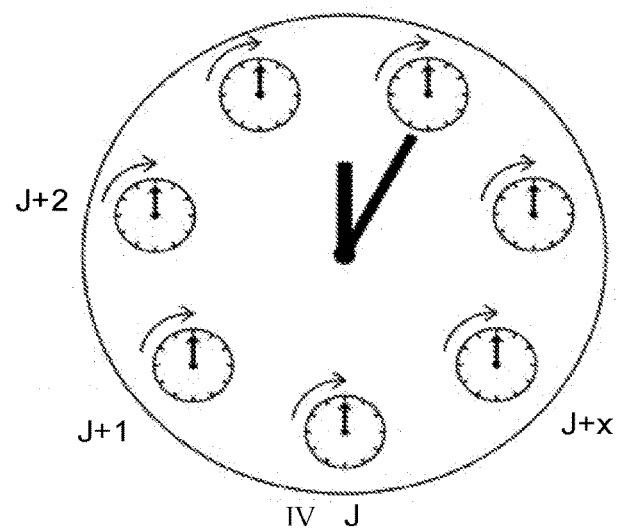
Figure 12D:
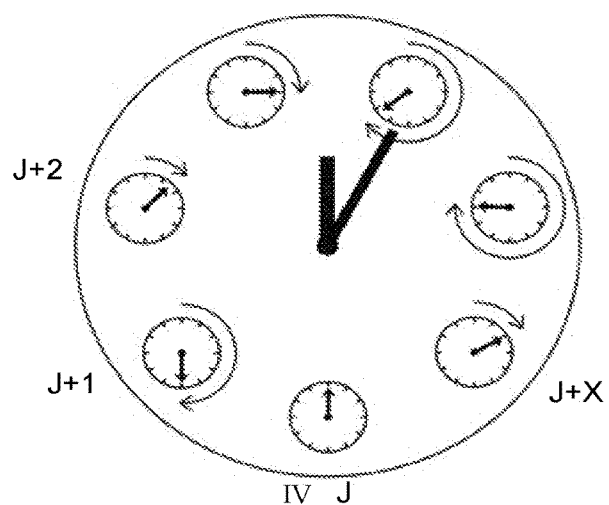
Figure 12E:
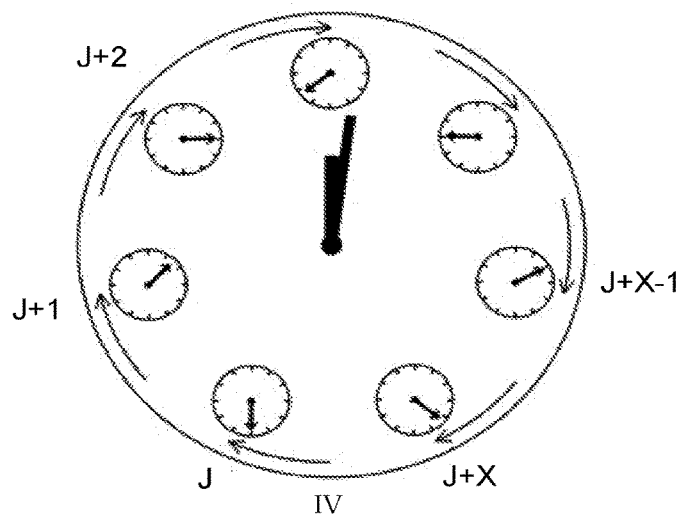
Figure 12F:
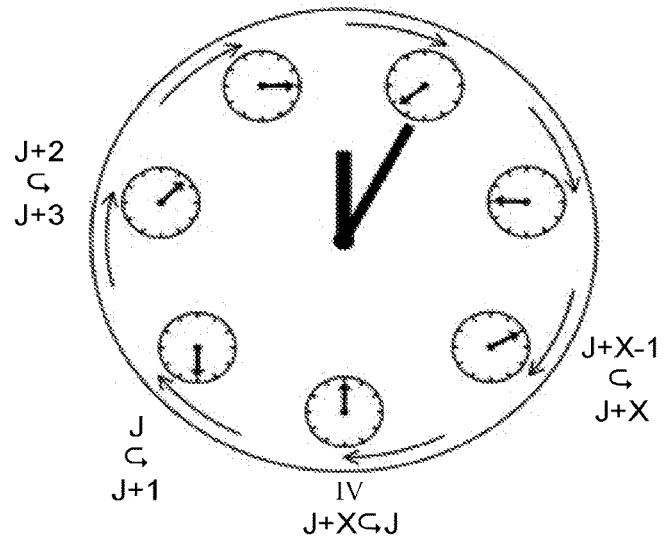

The diagrams of FIGS. 12C and 12D concern the change just after midnight in a variant with fixed dials, whereas the diagrams of FIGS. 12E and 12F concern the change just after midnight in a variant with dials that move through one notch each day, turning one increment with respect to the large dial that carries the small secondary dials.

The diagrams of FIGS. 12C and 12D show a one-day difference in activity for each dial There is disengagement of the dial indexing mechanism, reset of all the dials, reset of the day J−1 indication and a one-day shift in the indexing of the dials. Day J is in position IV in both of these diagrams.

The diagrams of FIGS. 12E and 12F show a one-day difference in activity for each dial. Day J is in position IV in the diagram of FIG. 12E, and changes into position V in the diagram of FIG. 12F. A disc rotation mechanism allows day J of FIG. 12E to be replaced in position IV by day J+X in FIG. 12F, with the hand reset to zero, and the engagement of the daily activity transmission. The dial indexing mechanism is disengaged, all the dials are reset, the day J−1 indication is reset, the dials are indexed with a one-day lag.

In a particular variant, watch 1 comprises an actuator 111, which can be actuated by the user, and which is arranged to control a reset mechanism 110 to remove the values displayed on at least a first display 81.

FIGS. 1 to 10 describe several non-limiting examples of constituent elements of a pedometer mechanism 2 according to the invention.

Moving or pivoting weight 3 preferably includes a weight pinion 31. This weight pinion 31 is advantageously arranged to cooperate, directly or indirectly, with a pair of reverser wheels 41, 42, which are arranged to transmit a movement in only one direction of pivoting to ratchet 4. Such a mechanism is well known for self-winding mechanisms, and is not described in detail here.

Figure 3:
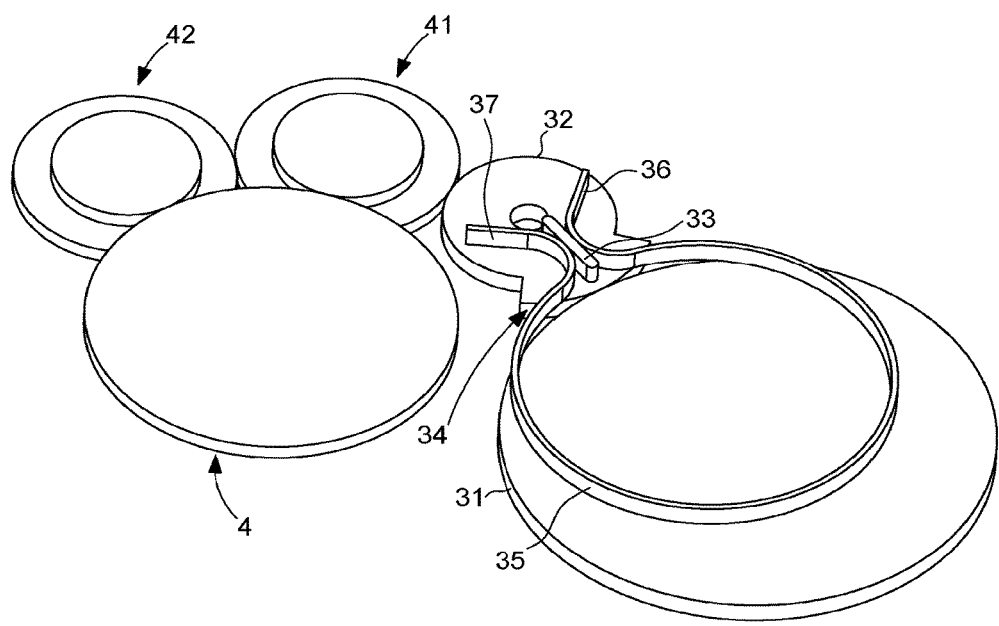
FIG. 3 is a perspective view of the first variant of FIG. 2.
Figure 2:
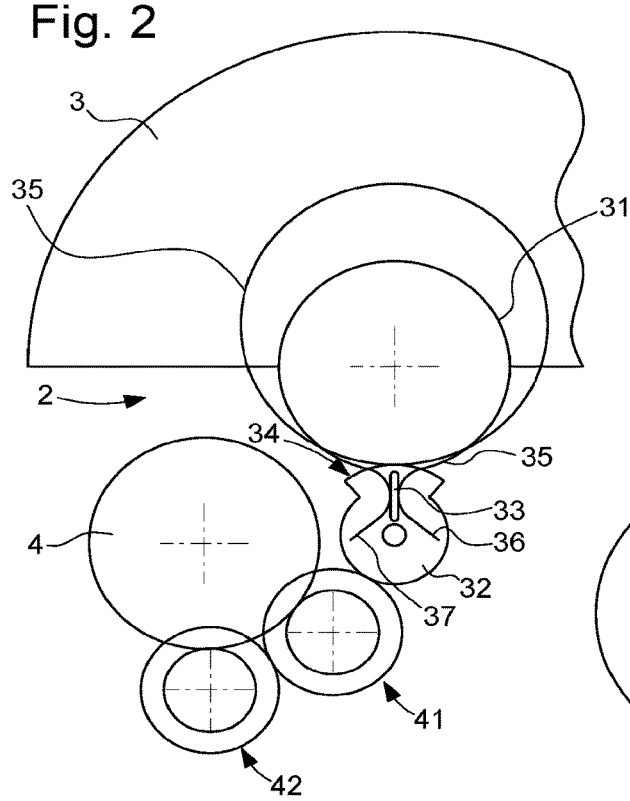
FIG. 2 shows a schematic plan view of a first variant of a counter mechanism comprised in a pedometer mechanism according to the invention, comprising a pivoting weight having a weight pinion that cooperates with a truncated wheel.

In the particular embodiment of FIGS. 2 and 3, weight pinion 31 meshes with a first toothed sector 34, which is toothed over less than half its periphery, and which comprises a finger 33, which is returned to a central position by branches 36, 37, of a return spring 35 of substantially circular shape, surrounding weight pinion 31 or moving or pivoting weight 3. This toothed sector 34 is integral with a wheel 32, which meshes with one of reverser wheels 41, 42, and spring 35 here forms the limiting means 20.

Figure 4:
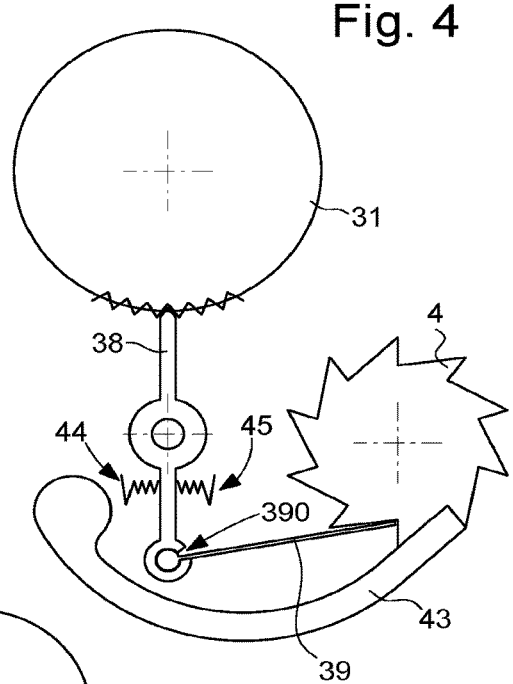
FIG. 4 represents, in a similar manner to FIG. 2, a second counter mechanism variant, wherein the weight pinion cooperates with a drive lever carrying an oblique transmission strip.
Figure 5:
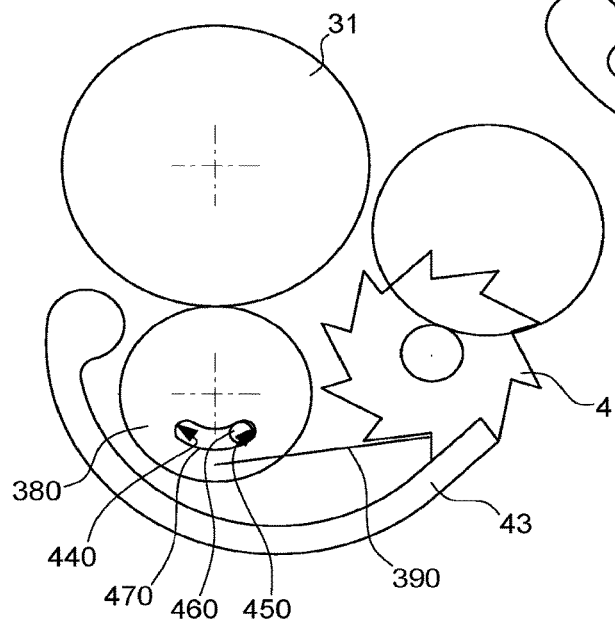
FIG. 5 represents another embodiment of the second variant of FIG. 4, wherein the drive lever is replaced by a toothed sector carrying the oblique transmission strip.

In the particular embodiment of FIGS. 4 and 5, moving or pivoting weight 3 comprises a weight pinion 31, which is arranged to drive the pivoting of a drive lever 38, or a drive sector or a wheel 380 in FIG. 5, which is returned to a median position by elastic return strips 44, 45, and which carries an oblique transmission strip 39. The transmission between wheel 31 and wheel 380 occurs by friction since wheel 31 must always be able to turn when pin 460 is blocking wheel 380. Oblique transmission strip 39 or 390 in FIG. 5 may be pivoted, with a limited travel and/or elastic return, inside a housing 391. In FIG. 5, the elastic return may be achieved via the elastic cooperation of a pin 460 elastically mounted with respect to a structure, relative to which pin pivots an oblong opening 470 of sais wheel 380, limited by abutment surfaces 440 and 450. Oblique transmission strip 39 is arranged, in only one direction of pivoting of drive lever 38 or of drive sector 38A, to push the toothing of a click wheel cooperating with ratchet 4 or to directly push the toothing of ratchet 4 in order to pivot the latter, and, to slide over the click wheel or respectively ratchet 4 without driving it, in the opposite direction of pivoting.

In a particular embodiment, limiting means 20 comprises at least one transmission jumper 43, which cooperates with the toothing of ratchet 4 to prevent the pivoting thereof when moving or pivoting weight 3 moves through an angle less than the minimum given angular value $\theta_0$.

In the variant of FIGS. 4 and 5, jumper 43 is arranged to cooperate with the click wheel or respectively ratchet 4 to prevent the return thereof.

In the particular embodiment of FIGS. 6 to 9, ratchet 4 comprises a toothing which is arranged to cooperate with a complementary toothing of a drive wheel 12 of axis perpendicular to that of ratchet 4, held by a jumper 5. This drive wheel 12 drives the pivoting of a shaft 11 which carries, in a fluted area, a sliding pinion 15 pushed back towards drive wheel 12 by a first elastic return means 33. This shaft 11 carries a radial arm 18, which is arranged to push back, against a second elastic return means 23, a second toothed sector 21, which extends in a plane parallel to pivot axis D0 of shaft 11 and remote therefrom, and whose toothing 22 drives a wheel 25 comprised in first display 81. At least one stop 34 advantageously limits the angular travel of second toothed sector 21, which is preferably returned by an elastic return means 210 towards shaft 11.

More particularly, and advantageously, shaft 11 is axially movable, into discrete positions that can be adjusted by the user acting on a first actuator 91, for example similar to pulling the stem of a winding and time-setting mechanism. The mechanism of FIGS. 6 to 9 may also use a number of components of such a conventional winding and time-setting mechanism. Shaft 11 is, in that case, arranged to drive a wheel 31 comprised in a second display 82 for displaying the effort level of the activity concerned.

In a variant, the plane of rotation of second toothed sector 21 may, under the action of a user, be moved closer to or farther from the axis of shaft 11 in order to modify the lever arm, and therefore the range of motion.

Preferably, watch 1 includes a date mechanism 10 controlling the daily jump at midnight of a finger 290 of a spring 29 in order to pivot a lever 19 cooperating with a groove 17 of sliding pinion 15, to return the latter against first elastic return means 33.

Figure 10:
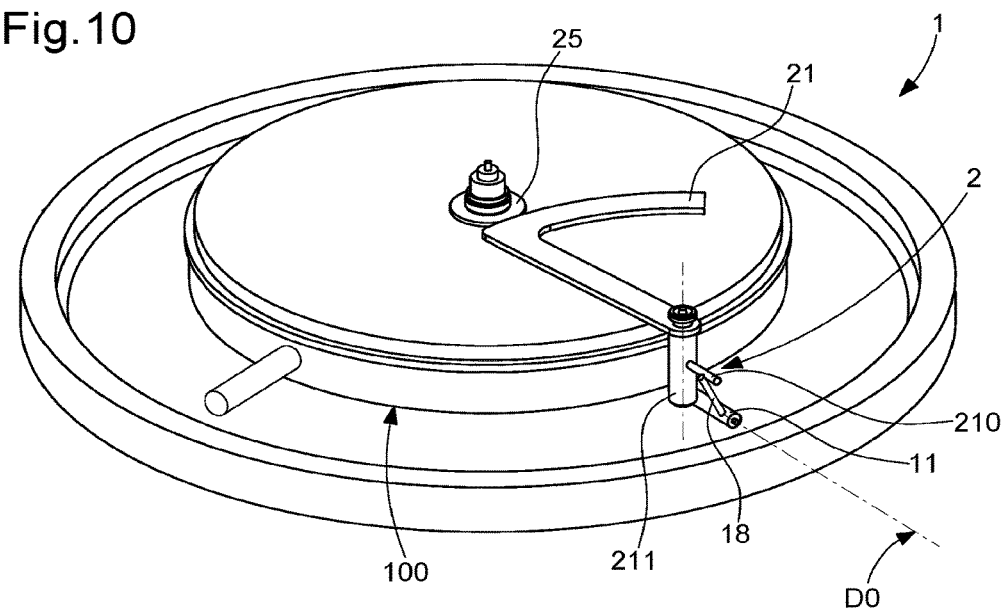
FIG. 10 shows a schematic perspective view of a second variant of the display mechanism, with a central display with respect to the watch.

FIG. 10 represents a second variant display mechanism, with a central display 25 with respect to watch 1. This display 25 is also controlled by a second toothed sector 21, which is integral with a shaft 211 and with a second arm 210, located in a plane parallel to a similar shaft 11 to that of FIG. 6, which shaft 11 also includes an oblique arm 18 which pushes second arm 210 and pivots shaft 211 and therefore second toothed sector 21. Here too, it is easy, as a result of the rack/pin system, to vary the transmission ratio to change the reference effort level.

In short, it is possible to tailor-make watch 1 for a determined use.

For example, for a watch 1 strictly used as a pedometer, the number of steps is equal to the number of back-and-forth motions of moving or pivoting weight 3. A mechanism for example causes a hand to advance one increment, when it detects an angle of rotation of the rotor greater than a given minimum value so as to filter out unwanted movements.

For version that evaluates an activity level, the activity level is proportional to the total movement of moving or pivoting weight. To total the cumulative rotation of the moving or pivoting weight, it is possible to use a known power reserve type mechanism, however without the connection to the barrel which would continually reduce the activity indication.

Figure 6:
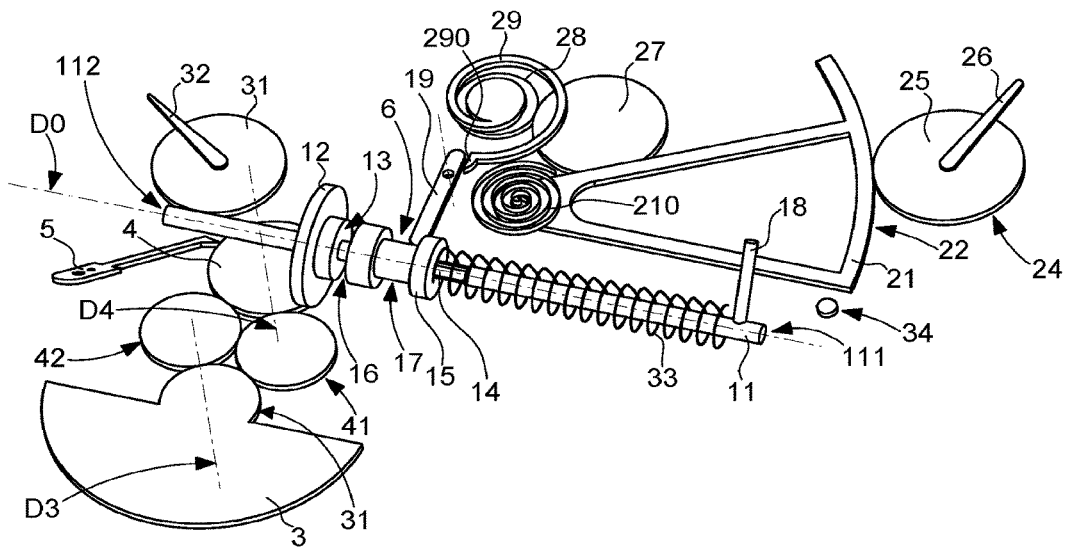
FIG. 6 represents, in a schematic perspective view, a first variant of a display mechanism comprised in a pedometer mechanism according to the invention, comprising a fluted shaft causing a toothed sector to pivot, this display mechanism comprising, on either side of the fluted shaft, a first physical activity display, and a second effort level display.
Figure 9:
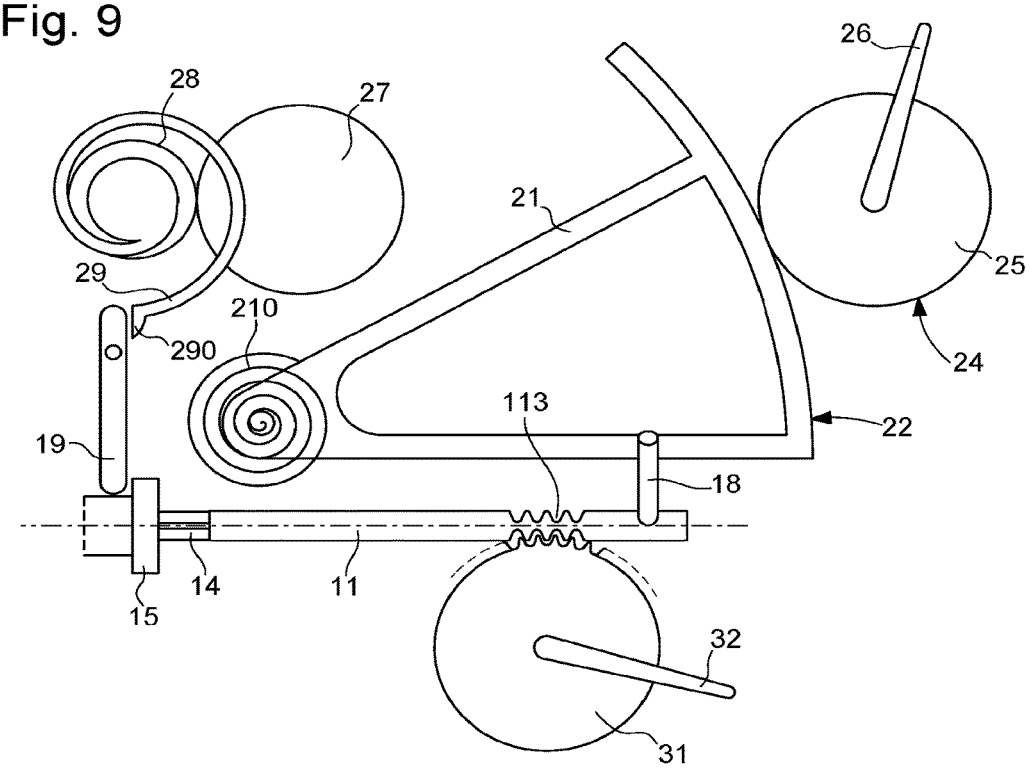
FIG. 9 represents a detail of another embodiment of the mechanism of FIG. 6, wherein the first display and the second display are side-by-side.
Figure 11:
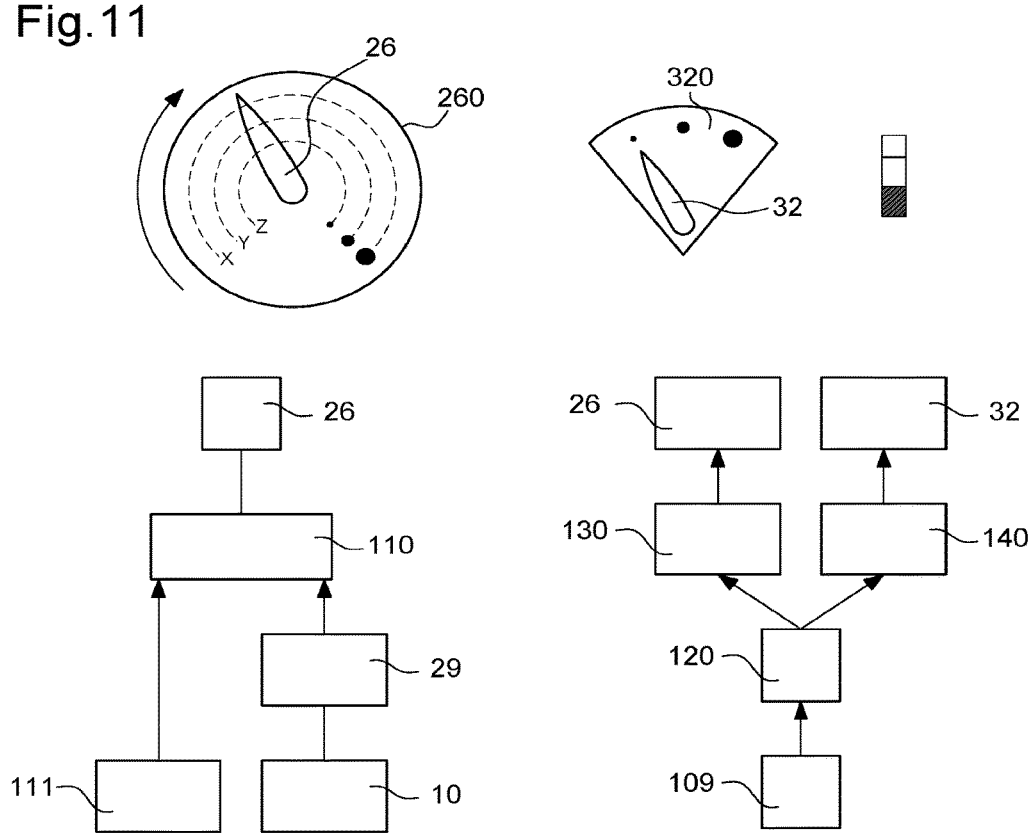
FIG. 11 is a diagram relating to the general operation of the pedometer, to the display reset, and to the display of physical activity, and of effort level.

As seen in FIG. 11, the daily reset is achieved:
- either by a date mechanism 10 of watch 1, or by a twenty-four hour wheel, which controls an activation mechanism every twenty-four hours, for example the beak of spring 29 of FIG. 6 controlling the pivoting of lever 19,
- or manually by a push-piece or a second actuator 111 controlling a reset mechanism,
- or by both.

Reset mechanism 110 thus controls the movement of activity level hand 26, with respect to a dial 260.

FIG. 10 also summarizes the physical activity and effort level display. An adjustment crown 109 acts on an amplitude adjustment mechanism 120 which acts, on the one hand, on an objective transmission mechanism 130 controlling the movement of an activity level hand 26 with respect to an activity dial 260, and on the other hand, a scale transmission mechanism 140 controlling the movement of an effort level hand 32 with respect to an effort level dial 320, or a bar with respect to a scale, or suchlike.

The utilisation of date mechanism 10 can also produce an animated display, for example in the form of a person who raises his arms higher and higher during the day according to the cumulative physical activity, and whose arms drop down again on the change to midnight.

What is claimed is:

1. A watch comprising a pedometer mechanism for estimating a physical activity level, comprising at least one moving or pivoting weight arranged to drive a ratchet, elastic or friction holding means for holding said ratchet in position between two movements of said moving or pivoting weight, wherein said ratchet drives a gear train displaying on a first display a value corresponding, to within a multiplicative factor, to the number of pivoting motions of said ratchet and/or to the value of the cumulative angular rotation of said ratchet, and wherein said pedometer mechanism comprises a limiting means only allowing the pivoting of said ratchet from a minimum threshold corresponding to a minimum travel of said weight if the weight is movable or to a minimum angular rotation value of said weight if the weight pivots, wherein said pedometer mechanism comprises a means for measuring the travel of movement of said moving or pivoting weight during each of its movements, and a means for cumulating the absolute values of the successive travels measured by said measuring means from an initial moment, wherein said watch comprises a control means for determining said initial moment and a final moment, and wherein said watch comprises display means comprising said first display and a means for the cumulative display of a magnitude homothetic to the cumulative value of said absolute successive travel values, and wherein said watch comprises a reset mechanism for removing the value displayed by said cumulative display means, wherein, each day, said initial moment is at zero hour, and said final moment is at midnight.

2. The watch according to claim 1, wherein said control means is a chronograph mechanism.

3. The watch according to claim 1, wherein said watch comprises a date mechanism arranged to actuate, daily at midnight, a reset mechanism to remove the values displayed on said first display.

4. The watch according to claim 1, wherein said pedometer mechanism comprises a reduction means, adjustable by the user via a first actuator, to change a display transmission ratio, according to the type of activity exerted by said user, and to select, on a second display comprised in display means of said watch, a scale of effort level.

5. The watch according to claim 1, wherein said watch comprises a plurality of said first displays each corresponding to a day of the week, and comprises a date mechanism arranged to actuate, daily before midnight, the reset of said first display for the following day, and at midnight, the change of display from said first display for the preceding day to said first display for the day that is beginning.

6. The watch according to claim 1, wherein said watch is arranged to be attached to a limb of a user, wherein said pedometer mechanism is arranged to estimate a physical activity level related to a movement of said limb or of said user of said watch, wherein at least one said weight is arranged to pivot about a weight axis under the action of movements of the user and said weight, which pivots, is arranged to drive, directly or indirectly, in only one direction of pivoting, at least one said ratchet about a ratchet axis, said pedometer mechanism comprising means for holding said ratchet by friction and/or elastic return arranged to hold said ratchet in position between two pivoting motions of said weight which pivots, and said ratchet driving a gear train arranged to display, on at least one display comprised in said watch, a value corresponding, to within a multiplicative factor, to the number of pivoting motions of said ratchet, and/or to the value of the cumulative angular rotation of said ratchet, and wherein said limiting means is arranged to only allow the pivoting of said ratchet from a minimum threshold corresponding a given minimum angular rotation value of said weight.

7. The watch according to claim 1, wherein said pedometer mechanism comprises a detection means arranged to detect the direction of movement of said moving or pivoting weight, and comprises a locking means arranged to only allow the pivoting of said ratchet if said detection means has recorded, since the preceding pivoting motion of said ratchet, at least one movement of said moving or pivoting weight in the opposite direction to that which allows the driving of said ratchet.

8. The watch according to claim 7, wherein said detection means comprises a first lever arranged to be driven by said moving or pivoting weight and changing angular position according to the direction of movement or pivoting in which said weight is driven.

9. The watch according to claim 8, wherein said locking means comprises a second bidirectional lever arranged to be immobilised or released by said first lever, according to the angular position of said first lever, and wherein said second bidirectional lever may or may not prevent the pivoting of said ratchet, according to the angular position of said second bidirectional lever.

10. The watch according to claim 9, wherein said locking means is a differential totalling mechanism.

11. The watch according to claim 1, wherein said watch comprises a second actuator actuatable by the user and arranged to control a reset mechanism for removing the values displayed on said first display.

12. The watch according to claim 1, wherein said limiting means comprises at least one transmission jumper cooperating with the toothing of said ratchet to prevent the pivoting thereof when said moving or pivoting weight moves through a shorter travel than a minimum given travel or through a smaller angle than said minimum given angle.

13. The watch according to claim 1, wherein said moving or pivoting weight pivots and comprises a weight pinion arranged to cooperate, directly or indirectly, with a pair of reverser wheels arranged to transmit a movement in only one direction of pivoting to said ratchet.

14. The watch according to claim 13, wherein said weight pinion meshes with a first toothed sector toothed over at least half the periphery thereof and which comprises a finger returned to a central position by branches of a return spring of substantially circular shape surrounding said weight pinion or said moving or pivoting weight, said toothed sector being integral with a wheel meshing with one of said reverser wheels, said spring forming said limiting means.

15. The watch according to claim 1, wherein said moving or pivoting weight comprises a weight pinion arranged to drive the pivoting of a drive lever or a drive sector which is returned to a median position by return strips and which carries an oblique transmission strip arranged, in only one direction of pivoting of said drive lever or of said drive sector, to push the toothing of a click wheel cooperating with said ratchet or to directly push the toothing of said ratchet in order to pivot the latter, and to slide over said click wheel or respectively said ratchet without driving said ratchet, in the opposite direction of pivoting.

16. The watch according to claims 12, wherein said jumper is arranged to cooperate with said ratchet to prevent the return thereof.

17. The watch according to claim 1, wherein said ratchet comprises a toothing arranged to cooperate with a complementary toothing of a drive wheel of axis perpendicular to that of said ratchet and driving the pivoting of a shaft carrying, in a fluted area, a sliding pinion pushed back towards said drive wheel by a first elastic return means, said shaft carrying a radial arm arranged to push back, against a second elastic return means, a second toothed sector extending in a plane parallel to the pivot axis of said shaft and remote therefrom and whose toothing drives a wheel comprised in said first display.

18. The watch according to claim 17, wherein an arbor is axially movable into discrete positions adjustable by an action of the user, and is arranged to drive a wheel comprised in a second display for the display of an effort level of the activity concerned.

19. The watch according to claim 17, wherein said watch comprises a date mechanism controlling the daily jump at midnight of a finger of a spring in order to pivot a lever cooperating with a groove of said sliding pinion to return the latter against said first elastic return means.

20. The watch according to claim 1, wherein said moving or pivoting weight is arranged to also replenish with energy at least one barrel or energy accumulator.

* * * * *